US011802983B2

(12) United States Patent
LeBlanc et al.

(10) Patent No.: US 11,802,983 B2
(45) Date of Patent: Oct. 31, 2023

(54) DISTRIBUTED ACOUSTIC SENSING TO GEOPHONE SEISMIC DATA PROCESSING

(71) Applicant: Halliburton Energy Services, Inc., Houston, TX (US)

(72) Inventors: Michel Joseph LeBlanc, Houston, TX (US); Mark Elliott Willis, Katy, TX (US); Andreas Ellmauthaler, Houston, TX (US); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 459 days.

(21) Appl. No.: 16/650,380

(22) PCT Filed: May 24, 2019

(86) PCT No.: PCT/US2019/034071
§ 371 (c)(1),
(2) Date: Mar. 24, 2020

(87) PCT Pub. No.: WO2020/242448
PCT Pub. Date: Dec. 3, 2020

(65) Prior Publication Data
US 2021/0405232 A1    Dec. 30, 2021

(51) Int. Cl.
*G01V 1/22* (2006.01)
*E21B 17/20* (2006.01)
(Continued)

(52) U.S. Cl.
CPC .............. *G01V 1/226* (2013.01); *E21B 17/20* (2013.01); *E21B 43/16* (2013.01); *G01H 9/004* (2013.01); *G01V 1/303* (2013.01); *G01V 1/42* (2013.01)

(58) Field of Classification Search
CPC .......... G01V 1/226; G01V 1/303; G01V 1/42; G01H 9/004; E21B 43/16
See application file for complete search history.

(56) References Cited

U.S. PATENT DOCUMENTS

2015/0346370 A1  12/2015  Martin et al.
2016/0131520 A1   5/2016  Martin et al.
(Continued)

FOREIGN PATENT DOCUMENTS

WO    2018101965 A1    6/2018

OTHER PUBLICATIONS

Ellmauthaler et al., Depth Calibration for DAS VSP—Lessons Learned from Two Field Trials, 2016 SEG, SEG International Exposition and 86th Annual Meeting, pp. 632-636 (Year: 2016).*
(Continued)

*Primary Examiner* — Toan M Le
(74) *Attorney, Agent, or Firm* — DELIZIO, PEACOCK, LEWIN & GUERRA

(57) ABSTRACT

Systems and methods relate to borehole seismic studies. Traditionally, borehole seismic studies are conducted using geophones. Seismic acquisition can be performed using fiber optic Distributed Acoustic Sensing (DAS). Because DAS measures dynamic relative displacement over a gauge length, which is different from particle velocity, DAS data can be converted into an equivalent geophone output response. Operations include converting DAS data into distributed velocity, and then, converting the velocity output into an equivalent geophone response. Various aspects include separating the data into interleaving subsets, integrating each subset along the spatial coordinates, selecting a window width over which the median of each subset will be calculated and subtracted from the data, performing a spatial average or low-pass filtering over contiguous values, performing a time-domain low-pass filtering, and performing the velocity-to-geophone conversion operation.

19 Claims, 11 Drawing Sheets

(51) Int. Cl.
  *E21B 43/16* (2006.01)
  *G01V 1/30* (2006.01)
  *G01V 1/42* (2006.01)
  *G01H 9/00* (2006.01)

(56) References Cited

U.S. PATENT DOCUMENTS

2017/0235006 A1  8/2017  Ellmauthaler et al.
2018/0329099 A1  11/2018 Erdimer et al.

OTHER PUBLICATIONS

Willis et al., Quantitative Quality of Distributed Acoustic Sensing Vertical Seismic Profile Data, Jul. 2016, The Leading Edge, Special Section: Advances in Seismic Sensors, pp. 605-609 (Year: 2016).*
Wu et al., Compressional- and Shear-Wave Studies of Distributed Acoustic Sensing Acquired Vertical Seismic Profile Data, Dec. 2017, The Leading Edge, Special Section: Fiber-Optic Distributed Sensing, pp. 987-993 (Year: 2017).*
PCT Application Serial No. PCT/US2019/034071, International Search Report, dated Feb. 24, 2020, 3 pages.
PCT Application Serial No. PCT/US2019/034071, International Written Opinion, dated Feb. 24, 2020, 6 pages.
Daley, "Comparison of Fiber Optic Monitoring with Conventional Geophone System at Aquistore", Lawrence Berkeley National Laboratory, IEAGHG 10th Monitoring Network Meeting, Berkeley, CA, Jun. 10-12, 2015, 23 pages.
Jreij, et al., "Field Data Comparison of 3D Horizontal Distributed Acoustic Sensing and Geophones", SEG Technical Program Expanded Abstracts, SEG International Exposition And 87th Annual Meeting, 2017, pp. 1-6.
Miller, et al., "Vertical Seismic Profiling Using a Fibre-Optic Cable as a Distributed Acoustic Sensor", EAGE, Expanded Abstracts, 74th EAGE Conference & Exhibition incorporating SPE EUROPEC 2012, Copenhagen, Denmark, Y004, Jun. 4-7, 2012, 5 pages.
Olofsson, et al., "Validation of DAS data integrity against standard geophones—DAS field test at Aquistore site", The Leading Edge 36 (12), Special Section: Fiber-optic distributed sensing, Dec. 2017, pp. 981-986.

* cited by examiner

Table 2: Velocity Calculations

| $p$ | A | B |
|---|---|---|
| 0 | $w'(z_k, t_j)$ | $w'(z_k, t_j)$ |
| 1 | $w'(z_k + g_L, t_j)$ | $w'(z_k, t_j) + \left(\dfrac{\lambda}{4\pi n\gamma}\right)\Delta\theta'_{DAS}(z_k, t_j)$ <br><br> *Using Eq. 3:* <br> $= w'(z_k, t_j) + w'(z_k + g_L, t_j) - w'(z_k, t_j)$ <br> $= w'(z_k + g_L, t_j)$ |
| $k$ | $w'(z_k + 2g_L, t_j)$ | $w'(z_k + g_L, t_j) + \left(\dfrac{\lambda}{4\pi n\gamma}\right)\Delta\theta'_{DAS}(z_k + g_L, t_j)$ <br><br> *Using Eq. 3:* <br> $= w'(z_k + g_L, t_j) + w'(z_k + 2g_L, t_j) - w'(z_k + g_L, t_j)$ <br> $= w'(z_k + 2g_L, t_j)$ |
| ⋮ | ⋮ | ⋮ |
| $p$ | $w'(z_k + pg_L, t_j)$ | $w'(z_k + (p-1)g_L, t_j) + \left(\dfrac{\lambda}{4\pi n\gamma}\right)\Delta\theta'_{DAS}(z_k + pg_L, t_j)$ <br><br> *Using Eq. 3:* <br> $= w'(z_k + (p-1)g_L, t_j) + w'(z_k + pg_L, t_j) - w'(z_k + (p-1)g_L, t_j)$ <br> $= w'(z_k + pg_L, t_j)$ |
| ⋮ | ⋮ | ⋮ |

FIG. 6

Table 3: Velocity Calculations for k=1

| $p$ | A | B |
|---|---|---|
| 0 | $w'(z_1, t_j)$ | $w'(z_1, t_j)$ |
| 1 | $w'(z_1 + g_L, t_j)$ | $w'(z_1, t_j) + \left(\frac{\lambda}{4\pi n\gamma}\right)\Delta\theta'_{DAS}(z_1, t_j)$<br>Using Eq. 3:<br>$= w'(z_1, t_j) + w'(z_1 + g_L, t_j) - w'(z_1, t_j)$<br>$= w'(z_1 + g_L, t_j)$ |
| 2 | $w'(z_1 + 2g_L, t_j)$ | $w'(z_1 + g_L, t_j) + \left(\frac{\lambda}{4\pi n\gamma}\right)\Delta\theta'_{DAS}(z_1 + g_L, t_j)$<br>Using Eq. 3:<br>$= w'(z_1 + g_L, t_j) + w'(z_1 + 2g_L, t_j) - w'(z_1 + g_L, t_j)$<br>$= w'(z_1 + 2g_L, t_j)$ |
| ⋮ | ⋮ | ⋮ |
| $p$ | $w'(z_1 + pg_L, t_j)$ | $w'(z_1 + (p-1)g_L, t_j) + \left(\frac{\lambda}{4\pi n\gamma}\right)\Delta\theta'_{DAS}(z_1 + pg_L, t_j)$<br>Using Eq. 3:<br>$= w'(z_1 + (p-1)g_L, t_j) + w'(z_1 + pg_L, t_j) - w'(z_1 + (p-1)g_L, t_j)$<br>$= w'(z_1 + pg_L, t_j)$ |
| ⋮ | ⋮ | ⋮ |

Table 4: Velocity Calculations for k=2

| $p$ | A | B |
|---|---|---|
| 0 | $w'(z_2, t_j)$ | $w'(z_2, t_j)$ |
| 1 | $w'(z_2 + g_L, t_j)$ | $w'(z_2, t_j) + \left(\frac{\lambda}{4\pi n\gamma}\right)\Delta\theta'_{DAS}(z_2, t_j)$<br>Using Eq. 3:<br>$= w'(z_2, t_j) + w'(z_2 + g_L, t_j) - w'(z_2, t_j)$<br>$= w'(z_2 + g_L, t_j)$ |
| 2 | $w'(z_2 + 2g_L, t_j)$ | $w'(z_2 + g_L, t_j) + \left(\frac{\lambda}{4\pi n\gamma}\right)\Delta\theta'_{DAS}(z_2 + g_L, t_j)$<br>Using Eq. 3:<br>$= w'(z_2 + g_L, t_j) + w'(z_2 + 2g_L, t_j) - w'(z_2 + g_L, t_j)$<br>$= w'(z_2 + 2g_L, t_j)$ |
| ⋮ | ⋮ | ⋮ |
| $p$ | $w'(z_2 + pg_L, t_j)$ | $w'(z_2 + (p-1)g_L, t_j) + \left(\frac{\lambda}{4\pi n\gamma}\right)\Delta\theta'_{DAS}(z_2 + pg_L, t_j)$<br>Using Eq. 3:<br>$= w'(z_2 + (p-1)g_L, t_j) + w'(z_2 + pg_L, t_j) - w'(z_2 + (p-1)g_L, t_j)$<br>$= w'(z_2 + pg_L, t_j)$ |
| ⋮ | ⋮ | ⋮ |

FIG. 7

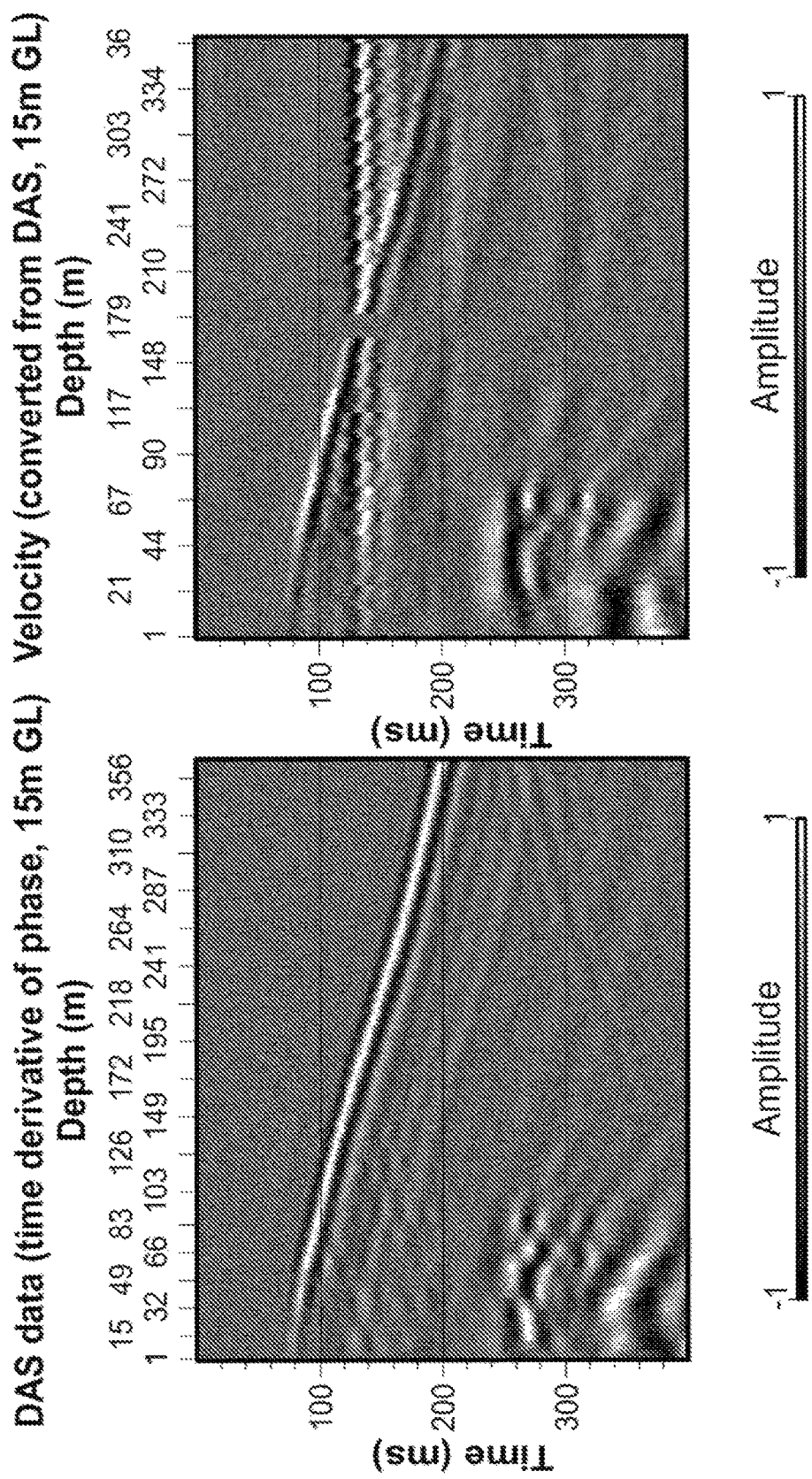

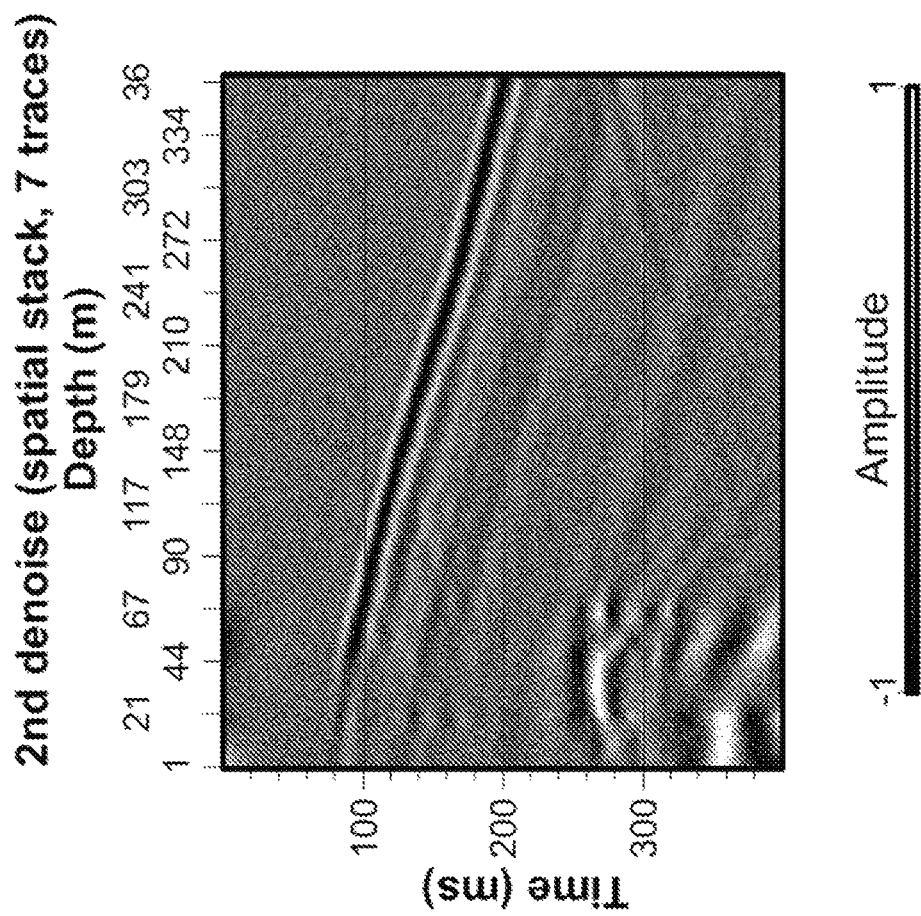

DISTRIBUTED ACOUSTIC SENSING TO GEOPHONE SEISMIC DATA PROCESSING

TECHNICAL FIELD

The disclosure relates generally to well drilling and completion operations, well logging, and petroleum resources reservoir characterization and monitoring. More particularly, this disclosure relates to the processing of Distributed Acoustic Sensing (DAS) data to convert to equivalent geophone seismic data for such operations.

BACKGROUND

Hydrocarbons, such as oil and gas, are commonly obtained from subterranean formations that may be located onshore or offshore. The development of subterranean operations and the processes involved in removing hydrocarbons from a subterranean formation can be complex. Typically, subterranean operations involve a number of different steps such as, for example, drilling a borehole (wellbore) at a desired well site, treating the borehole to optimize production of hydrocarbons, and performing the necessary steps to produce and process the hydrocarbons from the subterranean formation.

Certain sensing systems (such as a DAS system) include measurement and logging devices or various tools that generate, receive, or detect data and information from distant locations. For example, DAS systems may utilize an optical fiber cable as a sensing element. Downhole seismic data and information can be measured by an attached information handling system or an optoelectronic device. This data and information may, for instance, relate to the physical condition of a sensing system, the characteristics of a subterranean formation surrounding the borehole or sensing system, and proximate or surrounding temperature, acoustics, vibrations, or movement.

BRIEF DESCRIPTION OF THE DRAWINGS

Embodiments of the disclosure may be better understood by referencing the accompanying drawings.

FIG. 6 provides a table of velocity calculations.

FIG. 7 provides tables of example velocity calculations for k=1 and k=2.

FIGS. 8A and 8B depict a graph of example DAS data and a graph of example velocity data converted from the example DAS data.

FIG. 10 depicts a graph of the example equivalent geophone response after noise reduction.

DESCRIPTION OF EMBODIMENTS

Figure 1:
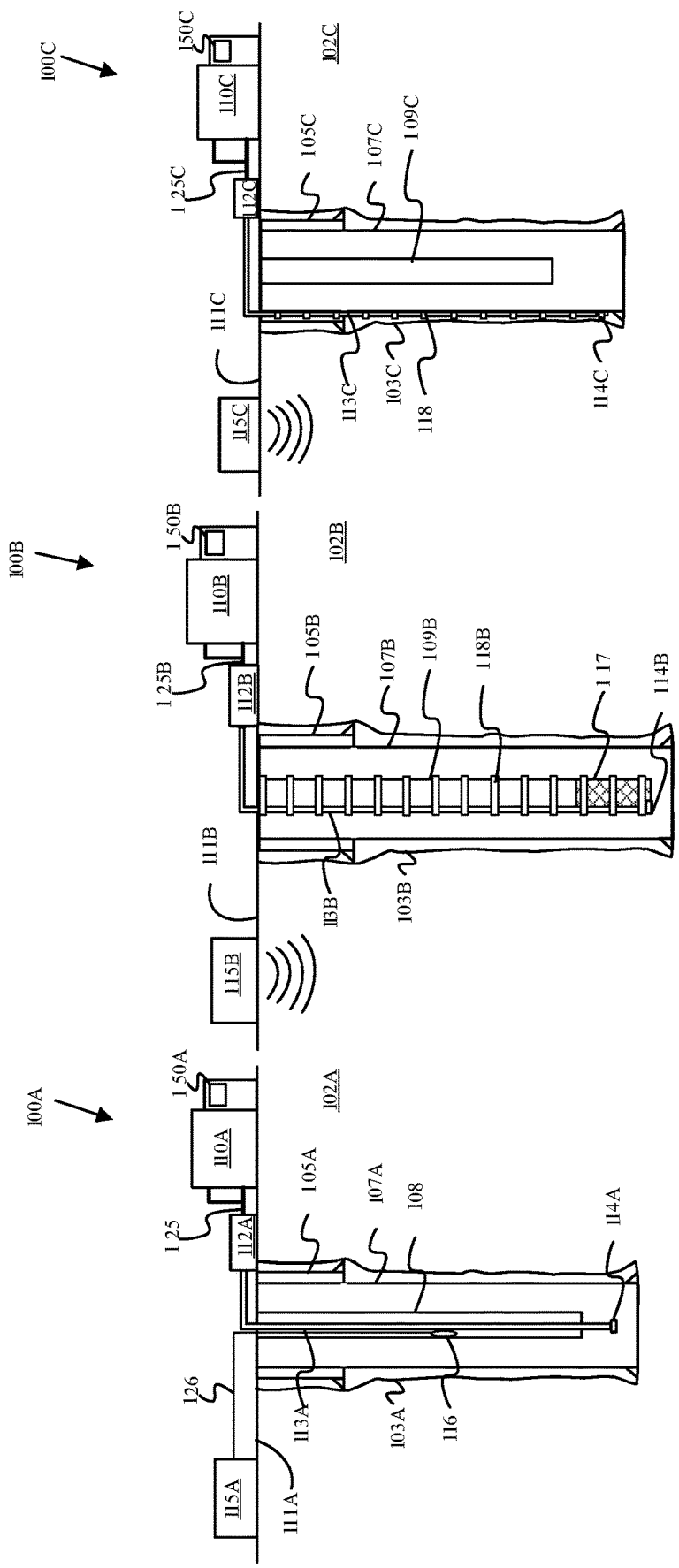
FIG. 1A depicts an elevation view of a wireline system that includes DAS, according to some embodiments.
FIG. 1B depicts an elevation view of a system that includes DAS having an optical fiber fixed to the outside of the production tubing in a cased borehole, according to some embodiments.
FIG. 1C depicts an elevation view of DAS having an optical fiber fixed to the outside of the production casing of a cased borehole, according to some embodiments.

The description that follows includes example systems, methods, techniques, and program flows that embody embodiments of the disclosure. However, it is understood that this disclosure may be practiced without these specific details. For instance, this disclosure refers to seismic exploration geophysics in illustrative examples. Embodiments of this disclosure can be also applied to earthquake seismology. In other instances, well-known instruction instances, protocols, structures and techniques have not been shown in detail in order not to obfuscate the description.

Traditionally, geophones have been used to perform borehole seismic monitoring. However, fiber optic DAS is a technology that is now taking a more prominent role in such monitoring. DAS measures integrated fiber strain over a gauge length, which can be different from "motion" or "particle" velocity provided by geophones for seismic monitoring. Because integrated strain is equivalent to displacement, DAS can also be considered to measure relative displacement over a gauge length. Equivalently, DAS can be considered to measure average strain over a gauge length because integrated strain normalized by the gauge length is by definition the average strain over that length. Furthermore, the time derivative of these signals can be obtained from DAS. Therefore, DAS can also be used to measure strain rate or rate of change of relative displacement over a gauge length. All of these DAS measurements are different from particle velocity measurements provided by geophones for seismic monitoring. Additionally, DAS measurements can be unfamiliar and potentially less useful for current systems and/or customers. Accordingly, various embodiments convert a DAS response to an equivalent geophone response such that the DAS output corresponds to measurements of particle velocity at specific locations in the borehole and not averaged over a gauge length (as provided by a DAS response).

Also, because DAS measures relative displacement over a gauge length, the DAS output does not have the same degree of "localization" that geophones provide. Thus, various embodiments can convert the DAS output such that the DAS output corresponds to measurements of particle velocity at specific locations and not averaged over the gauge length. It should be noted that "motion" velocity and "particle" velocity are used as synonyms in this disclosure and that these qualifiers are used to distinguish the velocity in question as a directly measured velocity as opposed to the various "wave velocities" that are characteristics of rock formations and wave types and represent the speed at which waves travel within the formations.

Thus, various embodiments can convert DAS data into particle velocity data, which can be called distributed velocity, similarly to how a Distributed Temperature Sensing system would measure distributed temperature. Additionally, the particle velocity output can be converted to an equivalent output as would be measured by a geophone of specific characteristics downhole (e.g., resonant frequency, damping ratio, etc.).

Various embodiments address the issue of the gauge length effect using operations that correspond with the physics downhole. Also, some embodiments do not require a priori knowledge of the wave velocities in the formation next to the fiber and do not require separation of ascending and descending waves to convert from a DAS output to an equivalent geophone response.

It is desirable that the fiber be coupled to the surrounding formation so there can be a one-to-one correspondence between the axial motion in the fiber and the vertical motion in the subsurface formation. In some embodiments, the particle velocity output derived from the DAS output is full-spectrum, with no phase shift. This particle velocity output can be a vibration that is independent of the formation velocity and can be more accurate than a geophone response. This particle velocity output can then be processed to match a geophone response. For example, this geophone response can be a result of low-pass filtering of the particle velocity output. Thus, in contrast to conventional approaches, various embodiments can provide a DAS to particle velocity conversion that does not require assumptions related to wave velocity and is self-contained.

Example Well System

FIG. 1A depicts an elevation view of a wireline system that includes DAS, according to some embodiments. A borehole 103A in the subterranean formation 102A includes a DAS system 100A that can detect seismic signals and/or seismic disturbances generated by a wireline-conveyed energy source 126 downhole. A seismic source 115A on an earth surface 111A may transmit electrical pulses through a wire 126 downhole to stimulate the wireline-conveyed energy source 116. The borehole 103A can be a completion well (i.e. a well ready for production or injection following a drilling process) having a surface casing 105A, a production casing 107A inside the surface casing 105A, and a wireline 108 inside the production casing 107A. In some embodiments, the wireline 108 can be replaced by another conveyance, e.g. a casing string, production string, tubing, coiled tubing, work string, slickline, or the like. The DAS system 100A includes an optical fiber 113A in the wireline 108 and a DAS signal acquisition system 112A that includes a DAS interrogator.

In some embodiments, the DAS interrogator in the DAS signal acquisition system 112A can be directly coupled to the optical fiber 113A. Alternatively, the DAS interrogator can be coupled to a fiber stretcher module in the DAS signal acquisition system 112A, wherein the fiber stretcher module is coupled to the optical fiber 113A. The DAS signal acquisition system 112A can receive DAS measurement values taken and/or transmitted along the length of the optical fiber 113A. In addition, the DAS signal acquisition system 112A can receive DAS measurement values from a bottomhole gauge carrier 114A that can transmit measurements through the optical fiber 113A. In some embodiments, the bottomhole gauge carrier 114A can include a pressure temperature gauge and can be inside of, or replaced by, a wireline scanning tool.

DAS measurement values transmitted through the optical fiber 113A can be sent to the DAS signal acquisition system 112A. The DAS interrogator of the DAS signal acquisition system 112A can be electrically connected to a digitizer to convert optically-transmitted measurements into digitized measurements. A computing device 110A can collect the electrically-transmitted measurements from the DAS signal acquisition system 112A using a connector 125A. The computing device can have one or more processors and a memory device to analyze the measurements and graphically represent analysis results on a display device 150A. In addition, the computing device 110A can communicate with components attached to the optical fiber 113A. For example, the computing device 110A can send control signals to the bottomhole gauge carrier 114A to modify gauge measurement parameters. Additionally, in some embodiments, at least one processor and memory device can be located downhole for the same purposes. With the optical fiber 113A positioned inside a portion of the borehole 103A, the DAS signal acquisition system 112A can obtain information associated with the subterranean formation 102A based on seismic/acoustic disturbances (e.g. seismic disturbances caused by the seismic source 115A).

FIG. 1B depicts an elevation view of a system that includes DAS having an optical fiber fixed to the outside of the production tubing in a cased borehole, according to some embodiments. The DAS system 100B includes an optical fiber 113B that can be fixed to the outer perimeter of the tubing 109B. Relative to the position of the optical fiber 113B of FIG. 1A, fixing the optical fiber 113B to the outer perimeter of the tubing 109B can increase the sensitivity of DAS measurements to changes in the annular region between the production casing 107B and the tubing 109B. Cross-coupling protectors such as a cross-coupling protector 118B can be used to fix the optical fiber 113B to the tubing 109B. In addition, a tubing tail 117 can also be fixed to the optical fiber 113B and extend below the bottom of the tubing 109B. Seismic energy source 115B on an earth surface 111B may transit electric pulses directly into the subterranean formation 102B.

FIG. 1C depicts an elevation view of DAS having an optical fiber fixed to the outside of the production casing of a cased borehole, according to some embodiments. The DAS system 100C includes an optical fiber 113C that can be fixed to the outer perimeter of the production casing 107C. Relative to the positions of the optical fiber 113A-B in FIG. 1A-B, fixing the optical fiber 113C to the outer perimeter of the production casing 107C can increase the sensitivity of DAS measurements to changes in the formation. Cross-coupling protectors such as a cross-coupling protector 118C can be used to fix the optical fiber 113C to the outer perimeter of the production casing 107C.

Figure 2:
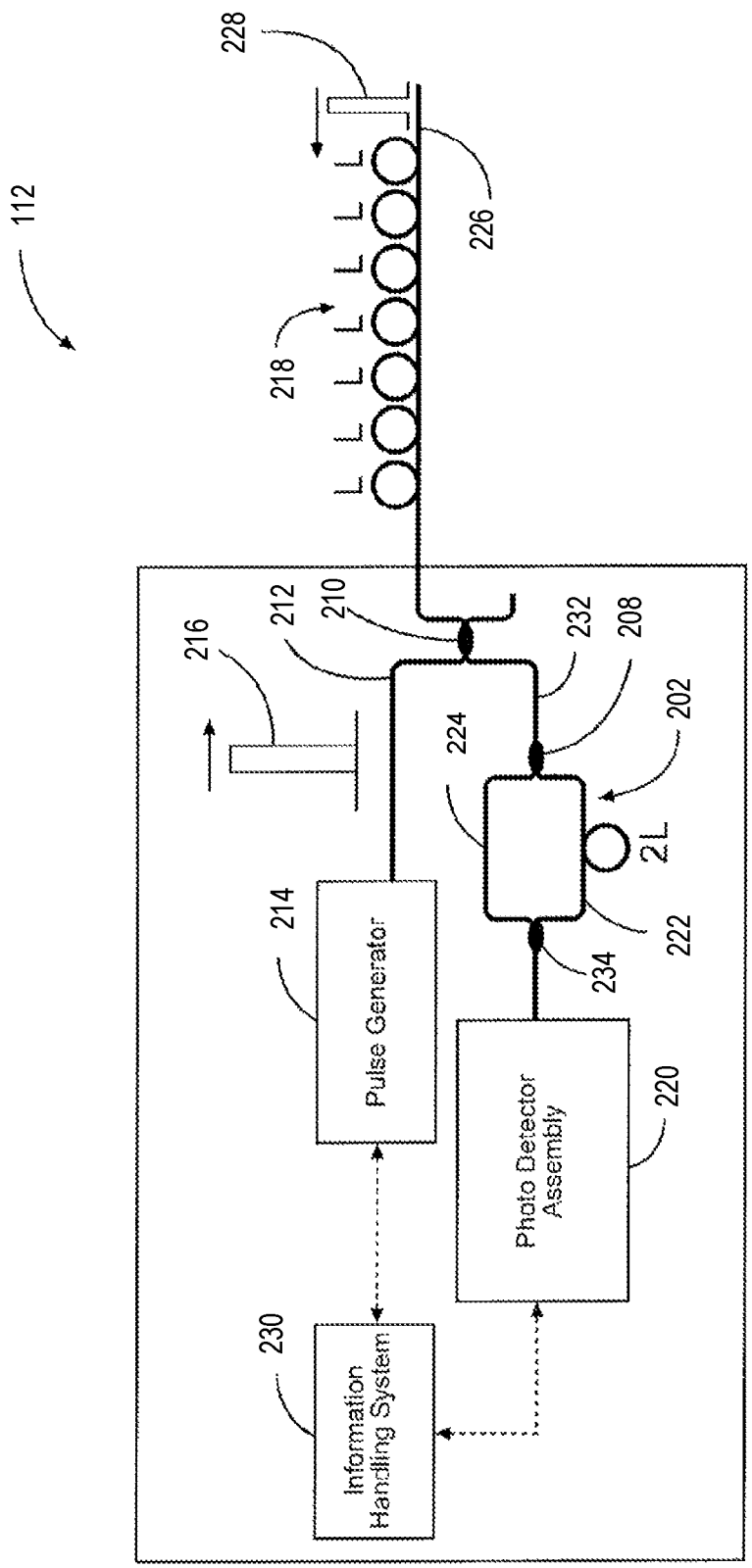
FIG. 2 depicts a distributed acoustic sensing system, according to some embodiments.

Referring now to FIG. 2, the DAS signal acquisition system 112A-C of FIG. 1A-C, collectively referred to as 112, is depicted. Typically, the DAS signal acquisition system 112 is installed at the surface and incorporated in a permanent monitoring installation. The DAS signal acquisition system 112 can also be incorporated in mobile surface data acquisition and processing facilities in a vehicle, such as a wireline truck. For offshore wells, the DAS signal acquisition system 112 may be incorporated on a drilling platform, a production platform, a drilling shop, or a floating production unit. The DAS may also be located on or near the seafloor in proximity to the well or at a remote location and connected via a lead-in optical fiber. The DAS signal acquisition system 112 may be a coherent Rayleigh scattering system with a compensating interferometer, as indicated, but is not intended to be limited to such.

A pulse generator 214 may be coupled to a first coupler 210 using the optical fiber 212. The pulse generator 214 may include associated opto-electronics and laser components. The first coupler 210 may be a traditional fused-type fiber optic splitter, a circulator, a PLC fiber optic splitter, or any other type of splitter known to those with ordinary skill in the art having the benefit of this disclosure. Optical pulses (e.g., optical pulse 216) from the pulse generator 214 may be amplified using optical gain elements, such as any suitable amplification mechanisms including, but not limited to, Erbium Doped Fiber Amplifiers (EDFAs) or Semiconductor Optical Amplifiers (SOAs). The pulse generator 214 may be an SOA operated as a switch.

A second coupler 208 may be coupled to an interferometer 202. The second coupler 208 may split light from the optical fiber 232 into two paths along a top interferometer arm 224 and a bottom interferometer arm 222. In other words, the second coupler 208 may split the backscattered light (e.g., backscattered light 228) from the optical fiber 232 into a first optical path and a second optical path. The first optical path may be the top interferometer arm 224. The second optical path may be the bottom interferometer arm 222. Light from the top and bottom interferometer arms 224, 222 can then re-combined at a third coupler 234 to form an interferometric signal. The first, second, and third couplers 210, 208, and 234 may be a traditional fused type fiber optic splitter, a PLC fiber optic splitter, or any other type of splitter known to those with ordinary skill in the art having the benefit of this disclosure.

The interferometer 202 may be used to determine the relative phase shift variations between the light in the top interferometer arm 224 and the bottom interferometer arm 222 as the light recombines. The relative phase shift is impacted by perturbations of the sensing fiber 226 because the delay in propagation times between the two interferometer arms means that light from two different backscatter locations along sensing fiber 426 arrives at the same time at photodetector 220. The spatial separation along the fiber for the origin of the light interfering is determined by the length imbalance of the interferometer arms. This separation is called the gauge length of the measurement and is typically of the order of 1 m to 40 m. The location of the interferometric signal can be determined using time of flight for the optical pulse 216 as is done in Optical Time Domain Reflectometry. The interferometric signal (i.e., the relative phase shift) will vary over the distance of a distributed sensing optical fiber 226. In the illustrative embodiment of FIG. 2, the interferometer is a Mach-Zehnder interferometer, but the embodiments are not limited to such. For instance, in some embodiments, a Michelson interferometer or any other type of interferometer may also be used without departing from the scope of the present disclosure.

The interferometer 202 may be coupled to a photodetector assembly 220. The photodetector assembly 220 may include associated optics and signal processing electronics (not shown). The photodetector assembly 220 may be a semiconductor electronic device that uses the photoelectric effect to convert light to electricity. The photodetector assembly 220 may include one or more avalanche photodiode(s) or one or more PIN photodiode(s) but the embodiments are not intended to be limited to such. As the light from the top interferometer arm 224 and the bottom interferometer arm 222 reach the third coupler 234, the photodetector assembly 220 may convert the optical signal (i.e., the interferometric signal) to an electronic signal that is related to the acoustic signal along the distributed optical fiber 226. The photodetector assembly 220 may be coupled to an information handling system 230. The information handling system 230 can be a computing device such as computing device 110A-C of FIGS. 1A-C. The photodetector assembly 220 and information handling system 230 may be communicatively and/or mechanically coupled. A first device may be communicatively coupled to a second device if it is connected to the second device through a wired or wireless communication network which permits the transmission of information. Thus, the information handling system 230 may be located uphole, downhole, or at a remote location. The information handling system 230 may also be communicatively or mechanically coupled to the pulse generator 214.

In operation of the system 112, the pulse generator 214 may generate a first optical pulse 216 which is transmitted through the optical fiber 212 to the first coupler 210. In certain implementations, the pulse generator 214 may be a laser. The first coupler 210 may direct the first optical pulse 216 through the optical fiber 226. At least a portion of the optical fiber 226 may be arranged in coils 218. As the first optical pulse 216 travels through the optical fiber 226, imperfections in the optical fiber 226 may cause a portion of the light to be backscattered along the optical fiber 226 due to Rayleigh scattering. Scattered light according to Rayleigh scattering is returned from every point along the optical fiber 226 along the length of the optical fiber 226 and is shown as backscattered light 228. This backscatter effect may be referred to as Rayleigh backscatter. Density fluctuations in the optical fiber 226 may give rise to energy loss due to the scattered light, with the following coefficient:

$$\alpha_{scat} = \frac{8\pi^3}{3\lambda^4} n^8 p^2 k T_f \beta \tag{1}$$

where n is the refraction index of the material composing the optical fiber 426, p is the photoelastic coefficient of the optical fiber 226, k is the Boltzmann constant, and β is the isothermal compressibility of the material composing the optical fiber 226. $T_f$ is a fictive temperature, representing the temperature at which the density fluctuations are "frozen" in the material composing the optical fiber 226. The optical fiber 226 may be terminated with a low reflection device (not shown). In certain implementations, the low reflection device may be a fiber coiled and tightly bent to violate Snell's law of total internal reflection such that all the remaining energy is sent out of the fiber. In other implementations, the low reflection device may be an angle cleaved fiber. In still other implementations, the low reflection device may be a coreless optical fiber with high optical attenuation. In still other implementations, the low reflection device may be a termination, such as the AFL Endlight.

The backscattered light 228 may travel back through the optical fiber 226, until it reaches the second coupler 208. The first coupler 210 may be mechanically coupled to the second coupler 208 on one side by the optical fiber 232 such that the backscattered light 228 may pass from the first coupler 210 to the second coupler 208 through the optical fiber 232. The second coupler 208 may split the backscattered light 228 based on the number of interferometer arms so that one portion of any backscattered light 228 passing through the interferometer 202 travels through the top interferometer arm 224 and another portion travels through the bottom interferometer arm 222. In other words, the second coupler 208 may split the backscattered light from the optical fiber 232 into a first optical path and a second optical path. The first backscattered path may be the top interferometer arm 224. The second backscattered path may be the bottom interferometer arm 222. These two portions may be recombined at the third coupler 234, and at that point, they may generate an interferometric signal. In an interferometric signal, two signals are superimposed from points separated by a distance of L, where L is related to the difference in length between the top interferometer arm 224 and bottom interferometer arm 222. For a Michelson interferometer configuration, L is the optical path difference between the two arms. For a Mach-Zehnder interferometer, L is half the optical path different between the two interferometer arms. This is because the optical path difference in the Michelson interferometer includes both the propagation toward the mirrors and away from the mirrors, which doubles the effect compared to the single-direction propagation seen in the interferometer arms of a Mach-Zehnder interferometer. The output from the interferometer 202, or the interferometric signal, includes backscattered interfered light from two positions. This interferometric signal may reach the photodetector assembly 220, where it may be converted to an electrical signal. The photodetector assembly 220 may integrate or add up the number of photons received in a given time period. The photodetector assembly 220 may provide output relating to the backscattered light 228 to the information handling system 230, which may convey the data to a display and/or store it in computer-readable media.

Example Operations

Figure 3:
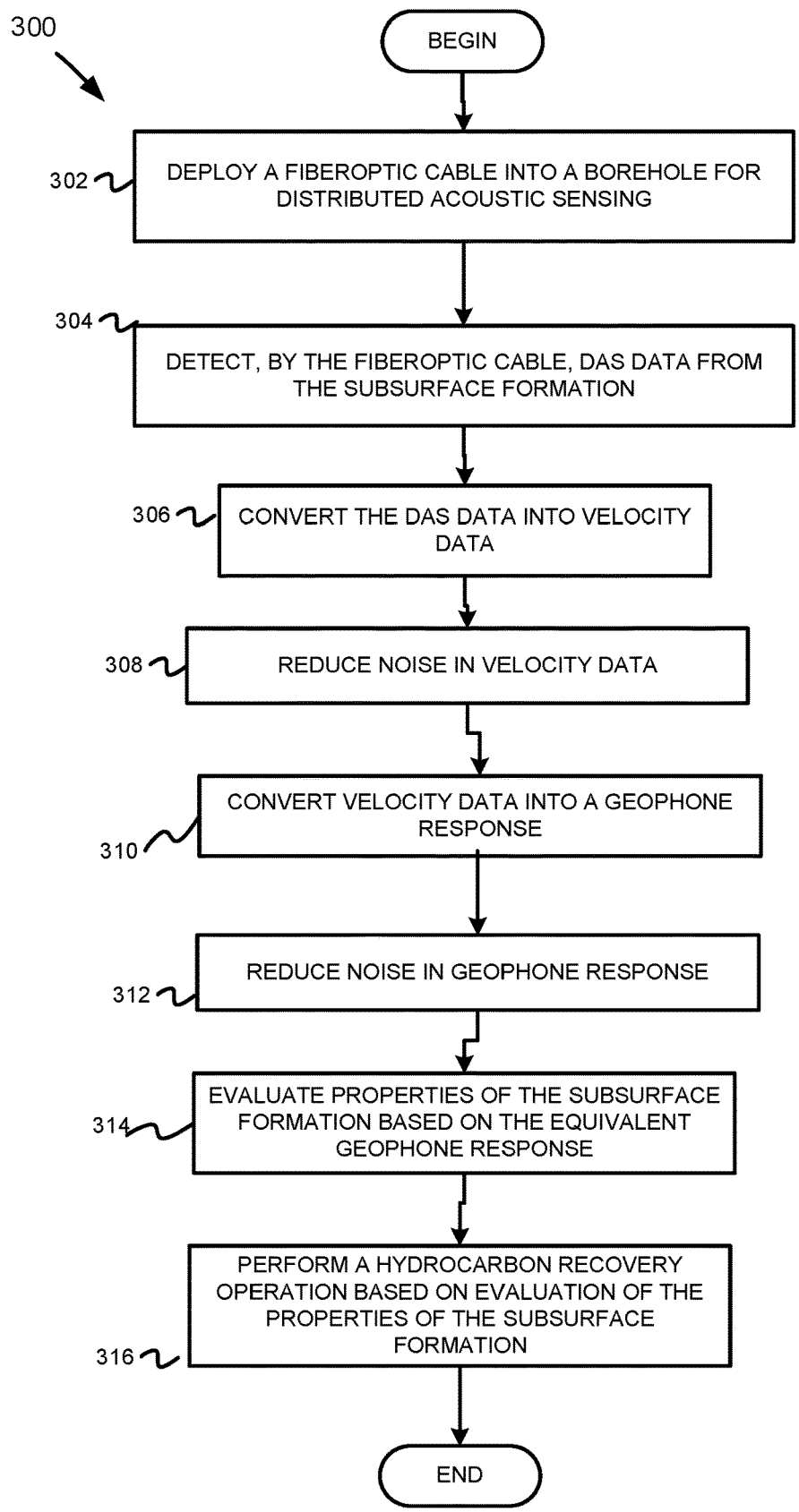
FIG. 3 depicts a flow chart of operations for converting DAS data to an equivalent geophone response for performing hydrocarbon recovery operations.
Figure 4A:
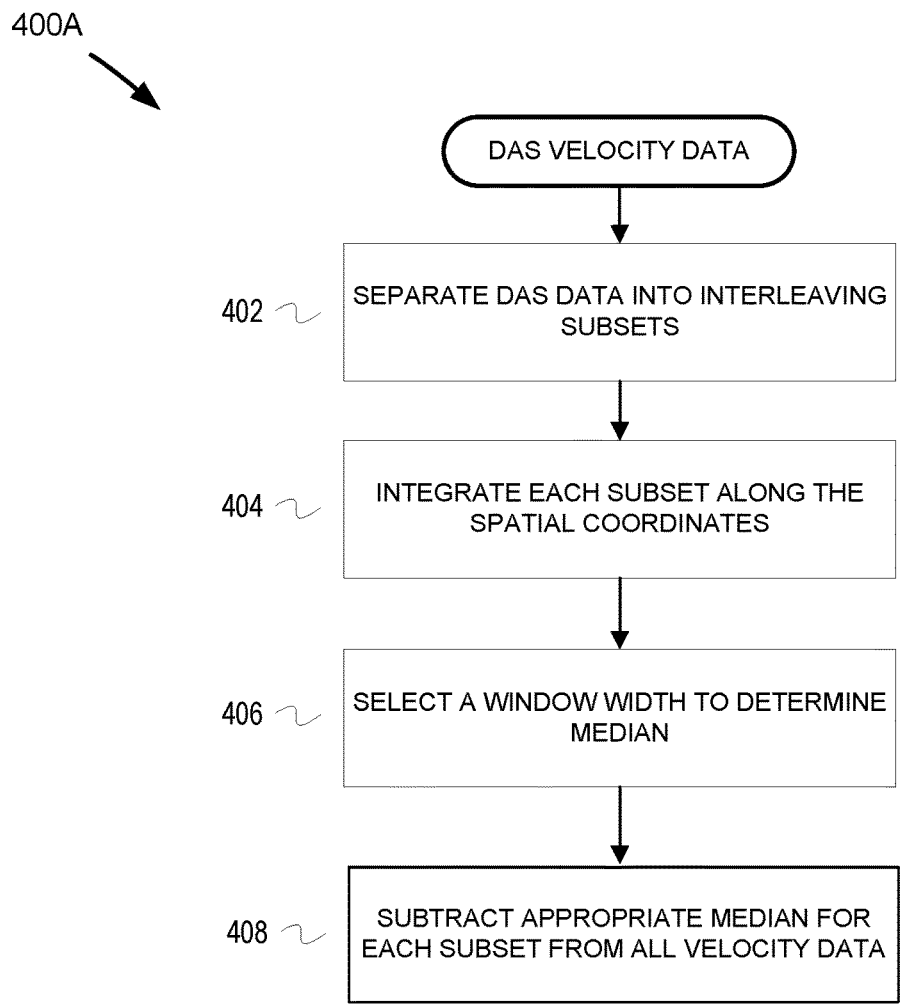
FIGS. 4A and 4B depict flowcharts of operations for reducing noise, according to some embodiments.

FIGS. 3-4 depict flowcharts of example operations for detecting and converting DAS data to geophone response data for formation evaluation, according to some embodiments. Flowcharts 300, 400A, and 400B of FIGS. 3-4 include operations that can be performed by hardware, software, firmware, or a combination thereof. For example, at least some of the operations can be performed by a processor executing program code or instructions. In some embodiments, such operations can be performed downhole in a DAS signal acquisition system and/or in a computer at the surface. Operations of the flowchart 300 start at block 302.

At block 302, an optical fiber for DAS is deployed in a borehole formed in a subsurface formation. For example, with reference to FIGS. 1A-C, the optical fiber can be deployed as part of a drilling, wireline or well completion operation.

At block 304, seismic data is detected using the optical fiber. A laser pulse is sent, by the pulse generator of the DAS signal acquisition system, along the optical fiber. The optical fiber acts as a sensing element. For example, the optical fiber can act as a sensing element to sense disturbances generated by a seismic source (115A-C of FIG. 1A-C). Measurements can be made and processed using an attached optoelectronic device to detect acoustic frequency signals and to generate seismic data based on the acoustic frequency signals. The measurements collected can be based on Rayleigh scattering, or elastic scattering of light by local variations of the index of refraction of the glass that are much smaller than the wavelength of the radiation. For a DAS system with a reference interferometer as in FIG. 2, the backscatter from two different regions of the fiber, separated by the gauge length L, are made to interfere with one another. A second laser pulse is sent after the first pulse has had time to travel the full length of the optical fiber and back. Changes in the measured intensity of successive pulses from the same region of the optical fiber are caused by changes in the optical path length of that section of the fiber. The changes in the optical path length can be due to disturbances generated by a seismic source. For a DAS system with a reference interferometer as in FIG. 2, the photodetector assembly 220 and the information handling system 230 are configured so that the output signals are time-of-propagation encoded signals (e.g., signals digitized at a rate of 100 MHz), resulting in two consecutive data points corresponding to a shift of the interrogation window, which has width L, by a step of 1 m of fiber) of the in-phase (I) and quadrature (Q) signals from which the phase of signal can be tracked. Thus, the DAS data output can be detected in the form of a difference in the phase of relative displacement. The raw DAS output detected can be represented by the formula:

$$\Delta\theta_{DAS}(z_i, t_j) = \left(\frac{4\pi n\gamma}{\lambda}\right)[(w(z_i + g_L, t_j) - w(z_i, t_j)) - (w(z_i + g_L, 0) - w(z_i, 0))] \quad (2)$$

where:

$\Delta\theta_{DAS}(z_i,t_j)$ is the data output, or the phase of relative displacement;

$z_i$ is the position along the optical fiber with i=1 to M where M is the total number of fiber locations, i.e. channels, and $z_i=(i-1)\Delta z$ where $\Delta z$ is the spacing between the fiber channels along the optical fiber (typically 1 m);

$g_L$ is the DAS interrogator gauge length;

$t_j$ is the time from the start of data collection where j=0 to N where N is the index of the last DAS profile, or measurement, collected;

n is the index of refraction of the material composing the optical fiber;

$\lambda$ is the wavelength of laser light used by the interrogator;

$\gamma$ is the strain-optic coefficient for axially loaded silica optical fiber ($\approx$0.78);

$w(z_i+g_L,t_j)$ is the displacement at $z_4+g_L$, at time $t_j$;

$w(z_i,t_j)$ is the displacement at location $z_i$, at time $t_j$;

$w(z_i+g_L, 0)$ is the displacement at location $z_i+g_L$, and time 0; and $w(z_i, 0)$ is the displacement at location $z_i$, at time 0.

Still referring to block 304, the DAS data is converted into a rate of relative displacement by taking the time derivative of the signal of Equation (2). After taking the time derivative, the distributed velocity function is given by Equation (3):

$$\Delta\theta'_{DAS}(z_i, t_j) = \left.\frac{\partial \Delta\theta_{DAS}}{\partial t}\right|_{z_i,t_j} = \left(\frac{4\pi n\gamma}{\lambda}\right)(w'(z_i + g_L, t_j) - w'(z_i, t_j)). \quad (3)$$

Equation (3) illustrates that the DAS at each depth $z_i$ involves a subtraction of particle velocity at a two different depths that are separated by the gauge length $g_L$.

At block 306, using an algorithm to be described below, the DAS output of Equation (3) is converted to a particle velocity output $V(z_i,t_j)$ defined as the time rate of change of displacement:

$$V(z_i,t_j)=w'(z_i,t_j) \quad (4)$$

where $w'(z_i,t_j)$ is the particle velocity (time derivative of displacement) at location $z_i$ and time $t_j$. However, this operation can introduce noise in the data. It is thus desirable to remove the noise after obtaining the results of Equation (4).

The algorithm to convert relative displacement into velocity obtains the result of Equation (4) from the input data of Equation (3). Equation (3) provides a change in DAS data in terms of two particle velocities at two different depths.

Reorganizing this equation into Equation (5) below reveals that if a particle velocity at a given point is known along with the DAS response for that point, a particle velocity at a distance away from the point can be calculated:

$$w'(z_i, +g_L, t_j) = \Delta\theta'_{DAS}(z_i, t_j)\left(\frac{4\pi n\gamma}{\lambda}\right) + w'(z_i, t_j). \quad (5)$$

Equation (5) shows that if the particle velocity at a location $z_i$ is known, the velocity at location $z_i+g_L$ can be determined. If the particle velocity at $z_i+g_L$ is known, the particle velocity at $z_i+2g_L$ can be calculated, and so on. The algorithm for converting DAS data to a geophone response takes advantage of this relation.

To utilize this relationship, DAS data can be separated into interleaving subsets. To do this, in some embodiments, an assumption about the gauge length can be made. Assuming the gauge length is a multiple of the interchannel spacing, such that $g_L/\Delta z$ is an integer, allows the profile to be divided into $G_L$ subsets, where $G_L$ is defined by Equation (6):

$$G_L = g_L/\Delta z. \quad (6)$$

While Equation (6) assumes the gauge length is an integer multiple of inter-channel spacing, non-integer multiple data can be interpolated to fit the method in alternative embodiments.

Figure 5:
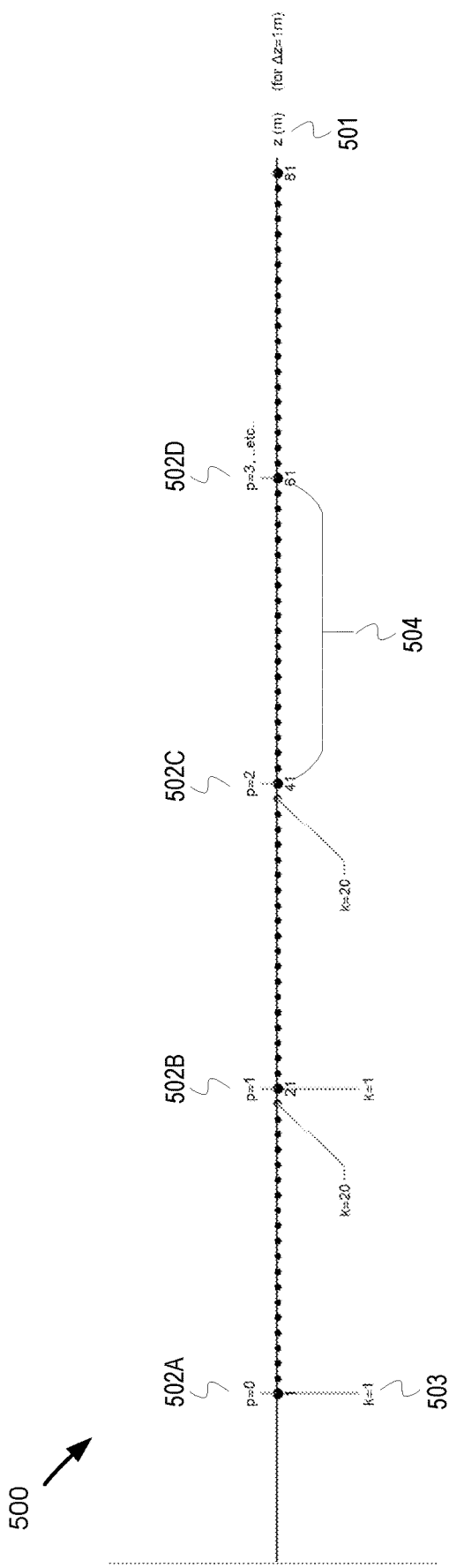
FIG. 5 depicts interleaving subsets of example DAS data.

FIG. 5 depicts example interleaving subsets of DAS data obtained from a DAS system for a particular gauge length (in this example using $g_L=20$ m, $\Delta z=1$ m, such that $G_L=20$). FIG. 5 shows an optical fiber 500 for obtaining DAS data measurements. The length of the optical fiber 500 is divided into a set number of gauge lengths (502A-D). In the example illustrated in FIG. 5, the gauge lengths 502A-D have a 20-meter separation. Those of skill in the art having the benefit of the disclosure will appreciate that other gauge lengths can be used. The p value represents the number of gauge lengths from the starting position. For instance, for optical fiber 500, 502A is the starting point, so 502A is zero gauge lengths from starting position and, therefore, p=0. The starting point of gauge length 502B is one gauge length from the starting position at 502A, so p=1. Point 502C is two gauge lengths from the starting position, so p=2. Point 502D is three gauge lengths from the starting position 502A, so p=3, and so on until the end of the optical fiber or desired measurement length. The optical fiber 500 can be further divided into subsets 503 defined by the starting point within the gauge length. The subsets (503) are denoted by the index k where k=1, 2, . . . , $G_L$ (20 in this case). In the example embodiment shown in FIG. 5, the optical fiber 500 is divided into 20 subsets 503 since $G_L=20$. It is noted that the starting point is arbitrary and FIG. 5 could have been drawn with p=0 in the middle of the graph. In this case, the algorithm is adjusted to account for negative values of p.

Despite the power of Equation (5) to generate particle velocity values from DAS measurements of each subset, it is recognized that, for each subset, the subset starts with a particle velocity value, or the seed value, and which is, a priori, unknown. Letting k=1 . . . $G_L$, Table 1 represents the unknown velocity seed values needed to generate the particle velocity values.

TABLE 1

Seed Unknowns

| k | Unknown |
|---|---|
| 1 | w' ($z_1$, $t_j$) |
| 2 | w' ($z_2$, $t_j$) |
| ... | ... |
| $G_L$ | w' ($z_{G_L}$, $t_j$) |

From Table 1, it is recognizes mat it me value or me sees panicle velocities were known, any particle velocity value could be generated. Equation (5) provides an iterative equation for determining the values of the unknown particle velocities. Iteratively, Equation (5) can be rewritten as:

$$\underbrace{w'(z_k + pg_L, t_j)}_{A} = \underbrace{w'(z_k, t_j) + \left(\frac{\lambda}{4\pi n\gamma}\right)\sum_{r=0}^{p-1}\Delta\theta'_{DAS}(z_k + rg_L, t_j)}_{B} \quad (7)$$

Where p is the number of gauge lengths away from the starting (seed) value where the computation of a seismic trace, or response of the earth due to the wave velocity, is desired. Analyzing the left-hand side and the right-hand side of Equation (7) separately demonstrates how knowing the seed particle velocities allows all particle velocities to be determined. The left-hand side of Equation (7) is denoted by "A" and the right-hand side of Equation (7) is denoted by "B."

Table 2 (FIG. 6) shows the two separate sides A and B of Equation (7) and demonstrates mathematically how particle velocity values can be generated from a seed particle velocity value for any subset of k. Table 2 assumes a given start value, w'($z_k$,$t_i$). In Table 2, the term in the summation can be replaced by the equivalent given in Equation (3). Substituting Equation (3) into Equation (7B) results in a cancellation of terms. For each value of p in Table 2, substituting Equation (3) into Equation (7B) results in A=B. This demonstrates that given a starting seed value, if the DAS profile, with data as time and depth, is known, then all particle velocities that include the starting seed value can be recovered through an iterative process.

Further verification of the iterative process is shown as examples for specific k values in Table 3 and Table 4 (FIG. 7). Table 3 and Table 4 show the iteration process fork values of 1 and 2, respectively. The last set in the iteration process is generated for k=$G_L$ (not shown).

The seed values can be determined by first assuming an average displacement value of zero for the DAS data. Because the signals are sinusoidal, the average displacement of each signal should be zero. The calculations are based on each subset being offset from other subsets. The offset is the error in assuming a seed value of zero and arises from noise occurring during the integration in Equation (7). Each interleaving subset is shifted by its own specific offset because each subset drifts in an individual path. These offsets can be recovered and eliminated. For the purposes of determining a solution to Equation (4), an assumption is made that the median output of the DAS in a VSP survey is zero. This assumption is based on the notion that the ground is shaken in the "infinitesimal" strain range. Thus, the ground is vibrated, but a permanent deformation does not typically occur. The disturbances introduced have positive and negative excursions, and it can be assumed that the average of the excursions will be zero. The same applies to velocity, which is the time derivative of displacement. Subtracting the offset from the calculated median of the subsets allows the median to be zero. Thus, by assuming a value of zero for the initial seed value, calculating the median and subtracting the offset intrinsically gives a corrected initial seed value. By doing this, de facto, a value to the initial seed value is assigned. The offset is equivalent to assigning an initial seed value. With this assumption, there are sufficient constraints to generate values for all the $w'(z_k,t_j)$. Using this information, a solution to Equation (4) can be determined.

Retuning to FIG. 3 at block 308, noise can be reduced in the obtained particle velocity data. The process of noise reduction in the particle velocity data is further described in FIG. 4A in blocks 402-406. Operations of flowchart 400A start at block 402.

At block 402, data is separated into interleaving subsets. This has been described in detail in block 306 and is represented by Equation (7) and FIG. 5.

At block 404, each subset along the spatial coordinates is integrated (i.e., summed, using Equation (7)). Integration over each subset (k=1, 2, up to $G_L$) can be performed by summing over each of the p values. However, random noise in the system impacts this integration. Since the DAS profile is separated into individual datasets, when noise is truly random, each subset is integrated over a different set of random noise. This can cause the summations to diverge from one subset to another.

At block 406, a window width is selected to determine a median value for each subset. One option is to select the entire subset ("global" window). Another option is to select a smaller window width and calculate the median over a portion of the subset, e.g., a "subsubset" of each subset ("local" window), where the "subsubsets" can be obtained as a traveling window over the subset. This can effectively limit the total range on integration so that the separate subsets do not diverge by very much.

At block 408, each particle velocity value is obtained from a subtraction of the original value. The output of Equation (7), with each of the seed values having been assigned the value zero, minus the median applicable to that value, obtained in step 406 using either the "global" window or the "local" window determines the particle velocity value. If a "global" window is used, the median of the new subset, which is the original subset minus its median, will be zero. With this operation, the dataset is converted so that each subset has zero median. This has the same effect as having selected the seed value of each subset to produce a zero median for that subset, as desired from the assumption made about the nature of the particle velocity profiles. If a smaller width is used ("local window"), the data is processed taking into account the fact that noise is random in each subset and by limiting the width of integration over which the median must be zero, limiting the divergence that the noise can create between the subsets.

Note that the actual window width is not set a priori. In some embodiments, the range can be determined by a user after review of the data.

In step 310, the transfer function of a geophone's response to particle velocity is applied to the particle velocity data to obtain an output similar to what a geophone would have produced if the geophone were the sensor measuring the particle velocity instead of DAS.

The geophone output is represented by Equation (8):

$$V_{geo}(z_i,t_j)=G(w'(z_i,t_j)) \quad (8)$$

where G is the transfer function. The geophone frequency response is typically that of a harmonic oscillator. It can be determined by the central resonance frequency and the circuit damping ratio of a geophone. In Equation (8), the transfer function, G, applies a filtering operation to the velocity. G can be a convolution of the particle velocity field and the geophone instrument responses (g) as given by Equation (9):

$$G(w'(z_i,t_j))=g*w'(z_i,t_j). \quad (9)$$

In the frequency domain, the geophone instrument response $\tilde{g}$ (the Fourier transform of g) at frequency f is related to the central resonance frequency $f_0$ and the circuit damping ratio A, as shown in Eq. (10):

$$\tilde{g}(f) = -S_G \frac{f^2}{-f^2 + 2i \cdot \lambda f \cdot f_0 + f_0^2}$$

Where $S_G$ is the geophone instrument-specific constant, and it is usually stated in the specification sheet or the user manuals of geophones. For VSP geophones, a typical resonance frequency will be $f_0$=15 Hz, and a typical damping ratio will be $\lambda$=0.7.

Figure 4B:
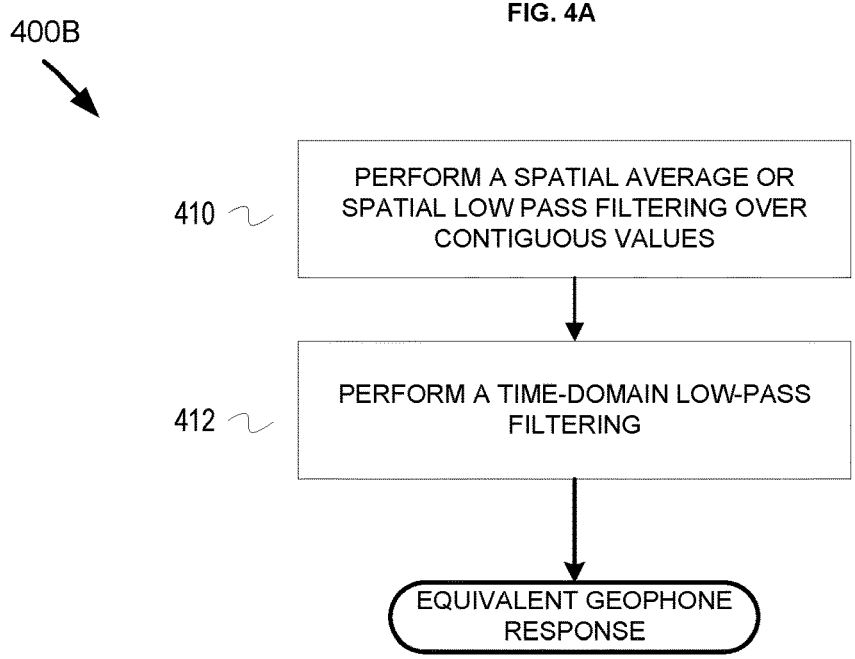

At block 312 of FIG. 3, noise is reduced in the geophone response. FIG. 4B is a flowchart 400B illustrating operations of two more processes that can be performed to further de-noise the data. The processes for noise reduction in the equivalent geophone response are described in further detail in blocks 410 and 412 of FIG. 4B.

At block 410, a spatial average or low pass filtering over contiguous values is performed. This process involves applying a stack of contiguous values to replace each data point by the mean of a traveling window. The value of each subset is replaced by the mathematical mean value of all the data subsets within the traveling window. This blends together the subsets, so the equivalent geophone response is a smoothed output of these datasets.

At block 412, time-domain low pass filtering is performed. The random noise introduced in the system is up to the Nyquist frequency. The real velocity output has a fixed bandwidth. Applying a time-domain low pass filter allows frequencies above the low-pass filter range to be filtered out of the data.

Retuning to FIG. 3, at block 314, properties of the subsurface formation are evaluated based on the equivalent geophone response. The subsurface formation can be characterized based on the data to analyze rock properties, fluid, fracture, and pore space characteristics of the formation.

At block 316, hydrocarbon recovery can be performed based on the evaluation of the properties of the subsurface formation.

While FIGS. 3 and 4 depict example embodiments of methods for converting DAS data to an equivalent geophone response, variations upon this method may be applied without changing the scope of the method. Example variations are provided. Variation A: omitting block 310 of flowchart 300. This can result in maintaining the particle velocity output and not getting a geophone response. Variation B: Omitting block 410 of flowchart 400B. Block 410 can be considered optional. Variation C: Replacing a window width median subtraction in block 406 with a global median subtraction. This is an alternate way of subtracting a median. Variation D: Subtracting the mean over the dataset instead of the median in block 606. In addition, any combination of the above variations may be utilized in various embodiments.

FIGS. 8A-B, 9A-B, and 10 depict an example of graphical representations of the data utilized by, and produced by, the methods of flowcharts 300, 400A and 400B of FIGS. 3 and 4.

FIG. 8A is a graphical representation of example seismic data such as DAS data that may be used at block 306 (FIG. 3). FIG. 8A is a graph of example DAS data for a 15 m gauge length fiber optic cable. FIG. 8A is a plot of Equation (3) for $z_4$ values ranging from 1 to 356 m and $t_j$ values from 0 to 400 ms. The graph plots the time rate of relative displacement, expressed in units of optical phase change, normalized, for each depth, to the maximum absolute value over the full time trace, such that signals remain with a range between −1 and 1 for each trace. The greyscale shows the amplitude of the signals with black representing an amplitude of −1 and white representing an amplitude of +1. Shades of grey represent the various amplitude between −1 and +1. The graph displays an overall trend around 0 amplitude with 3 distinct lines of −1, +1, −1 amplitudes extending from approximately (1, 100) to (356, 225). In VSP parlance, this trace is the that of the "first break" as picked up by the DAS acquisition system.

FIG. 8B is a graphical representation of the particle velocity converted from DAS data in block 306 (FIG. 3). FIG. 8B uses a similar greyscale pattern as FIG. 8A. Comparing FIG. 8B with FIG. 8A, it is apparent the particle velocity data converted from DAS of FIG. 8B does not display the smooth linear trends associated with the DAS data of FIG. 8A. Here the starting gauge length for the integration (p=0) has been selected at the mid-depth location, around 190 m, and this is the reason for the distinct gap in the data around that depth, for the width of 15 m (the gauge length) where the seed values are assumed to be $w'(z_k, t_j)=0$.

Figures 9A, 9B:
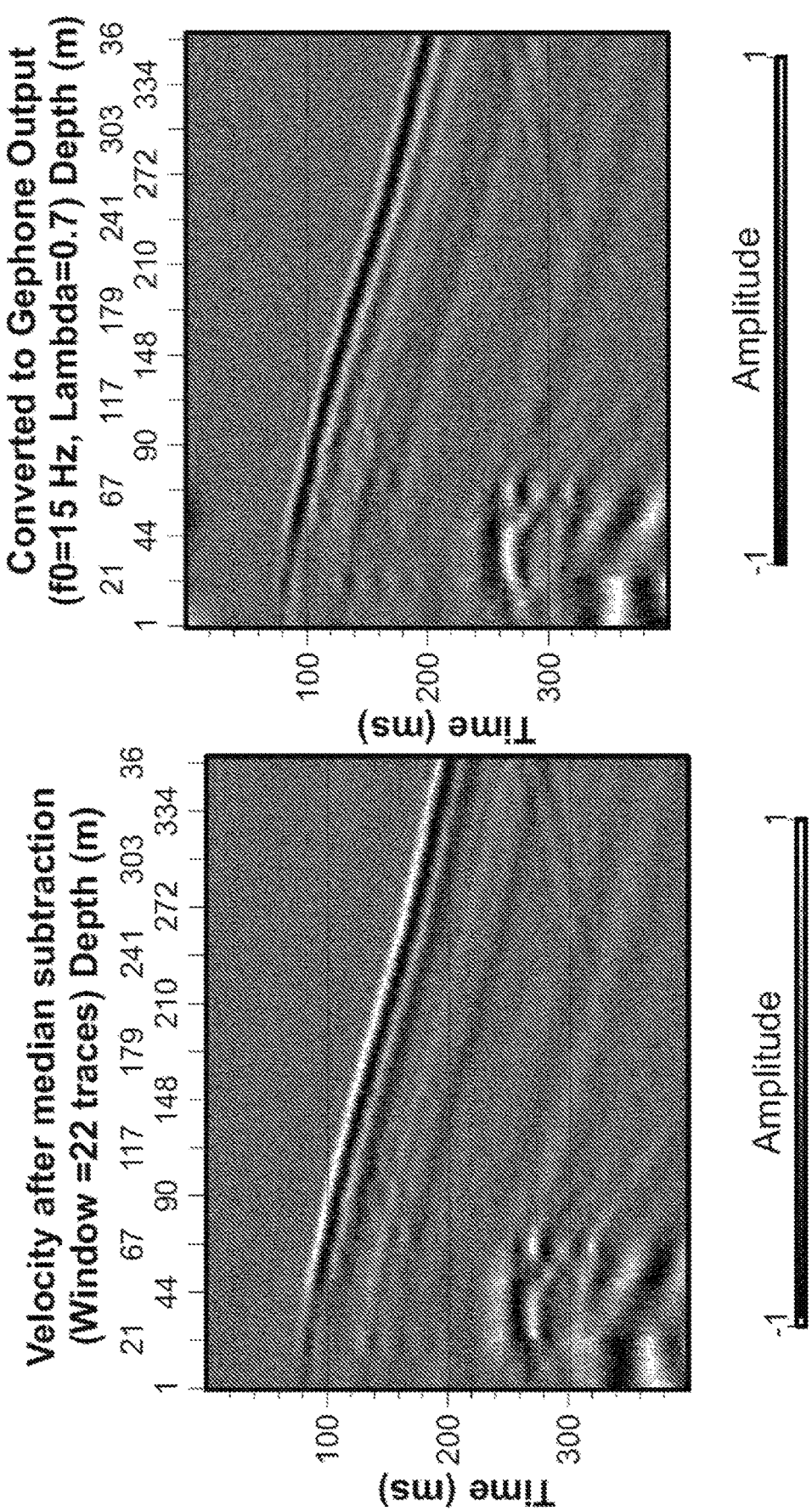
FIGS. 9A and 9B depict a graph of the example velocity data after noise reduction and a graph of an example equivalent geophone response converted from the example velocity data.

FIG. 9A is an example graph of particle velocity data after noise reduction. FIG. 9A represents the results of subtracting the local median as described in block 406 (FIG. 4). FIG. 9A uses the same scale and greyscale pattern as FIGS. 8A-B. Through the noise reduction process, the trends in FIG. 9A more closely resemble the trends seen in FIG. 8A with the exception that the amplitude trends are inverted. For the example graph illustrated in FIG. 9A, a window width of 22 traces was used, meaning that each "subsubset" over which the "local" median is calculated comprises 22 contiguous values of p (referring to Table 2 of FIG. 7).

FIG. 9B is a graph of an equivalent geophone response converted from particle velocity data as depicted in block 310 (FIG. 3). FIG. 9B plots time in milliseconds as a function of depth in meters. The central resonance frequency is 15 HZ and the circuit damping ratio is 0.7. FIG. 9B shows a linear, decreasing trend in the data from approximately (1, 75) to (336, 225).

FIG. 10 shows a graph of the converted geophone response after de-noising as described in block 410 (FIG. 4). Comparing FIG. 10 with FIG. 9B, the linear trend lines in FIG. 10 appear smoother than the linear trend lines in FIG. 9B.

Example Computer

Figure 11:
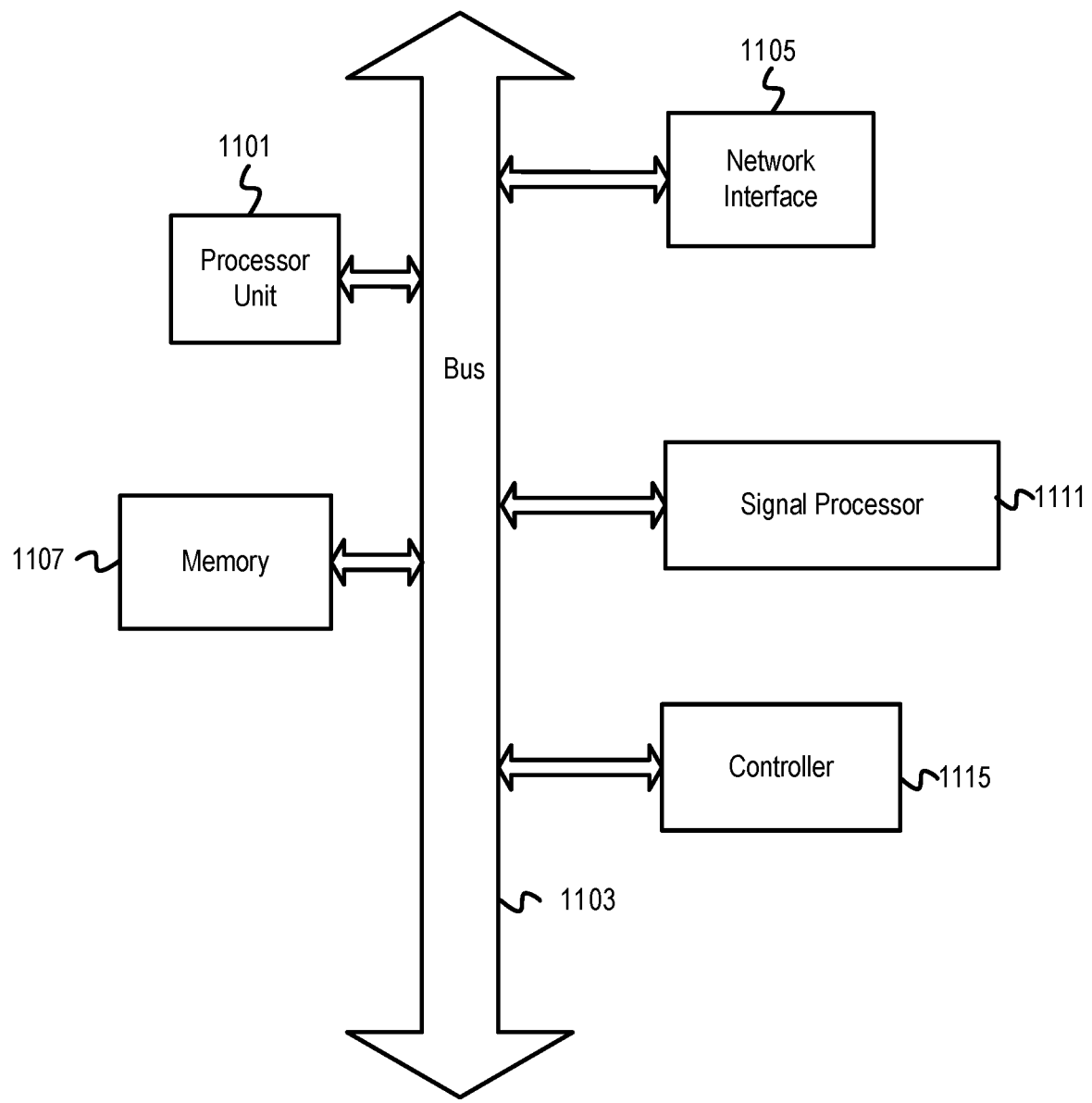
FIG. 11 depicts an example computer, according to some embodiments.

FIG. 11 depicts an example computer, according to some embodiments. The computer includes a processor 1101 (possibly including multiple processors, multiple cores, multiple nodes, and/or implementing multithreading, etc.). The computer includes memory 1107. The memory 1107 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1103 and a network interface 1105.

The computer also includes a signal processor 1111 and a controller 1115. The signal processor 1111 can perform processing of the DAS signals to remove noise from the data (as described above). The controller 1115 can control the different operations that can occur in the response to results from processing of the DAS data. For example, the controller 1115 can communicate instructions to the appropriate equipment, devices, etc. to evaluate properties of the subsurface formation based on the equivalent geophone response or perform a hydrocarbon recovery operation based on the evaluation of the properties of the subsurface formation. Any one of the previously described functionalities may be partially (or entirely) implemented in hardware and/or on the processor 1101. For example, the functionality may be implemented with an application specific integrated circuit, in logic implemented in the processor 1101, in a co-processor on a peripheral device or card, etc. Further, realizations may include fewer or additional components not illustrated in FIG. 11 (e.g., video cards, audio cards, additional network interfaces, peripheral devices, etc.). The processor 1101 and the network interface 1105 are coupled to the bus 1103. Although illustrated as being coupled to the bus 1103, the memory 1107 may be coupled to the processor 1101.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software, or a combination of software and hardware aspects that may all generally be referred to herein as a "circuit," "module" or "system." The functionality presented as individual modules/units in the example illustrations can be organized differently in accordance with any one of platform, application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

A method can comprise deploying an optical fiber in a borehole in a subsurface formation. Distributed acoustic sensing (DAS) data is detected from a seismic wave traversing the subsurface formation via the optical fiber. The DAS data comprises measurements of a relative displacement of light over a gauge length of the optical fiber. The DAS data is separated into a plurality of interleaving subsets associated with positions along the optical fiber. Distributed velocity data is determined from the interleaving subsets. The distributed velocity data can comprise particle velocity values for subset positions within the interleaving subsets.

Determining particle velocity values for the subset positions within the interleaving subsets can comprise determining a seed particle velocity value for an interleaving subset and determining the particle velocity values for the subset positions within the interleaving subset based on the seed particle velocity value and distances along the optical fiber associated with the subset positions. Determining the seed particle velocity value can comprise determining first median values for the interleaving subsets and determining offsets for the interleaving subsets such that subtracting the offsets for the interleaving subsets from the first median values of the interleaving subsets results in second median values of zero for the interleaving subsets. A number of the interleaving subsets can be determined according to a gauge length of the optical fiber and an interchannel spacing. Determining the distributed velocity data from the interleaving subsets can comprise determining a time rate of change of the relative displacement of light over the gauge length of the optical fiber. The method can further comprise converting the distributed velocity data to equivalent geophone response data for the seismic wave. Converting the distributed velocity data to the equivalent geophone response data for the seismic wave can comprise applying a transfer function to the distributed velocity data. The transfer function can comprise a convolution of the distributed velocity data and a geophone instrument response. Converting the distributed velocity data to equivalent geophone response data can comprise converting the distributed velocity data according to a central resonance frequency of a geophone and a circuit damping ratio of the geophone. The method can further comprise performing an evaluation of the subsurface formation based on the equivalent geophone response data and performing a hydrocarbon recovery operation based on the evaluation of the subsurface formation.

A system can comprise a processor and a machine-readable medium having program code executable by the processor to cause the apparatus to receive distributed acoustic sensing (DAS) data comprising measurements of a relative displacement of light over a gauge length of an optical fiber, separate the DAS data into a plurality of interleaving subsets associated with positions along the optical fiber, and determine distributed velocity data from the interleaving subsets. The distributed velocity data comprises particle velocity values for subset positions within the interleaving subsets.

The program code to cause the apparatus to determine particle velocity values for the subset positions within the interleaving subsets can comprise program code to determine a seed particle velocity value for an interleaving subset and determine the particle velocity values for the subset positions within the interleaving subset based on the seed velocity value and distances along the optical fiber associated with the subset positions. The program code to cause the apparatus to determine the seed particle velocity value can comprise program code to determine first median values for the interleaving subsets and determine offsets for the interleaving subsets such that subtracting the offsets for the interleaving subsets from the first median values of the interleaving subsets results in second median values of zero for the interleaving subsets. The program code can further comprise program code to convert the distributed velocity data to equivalent geophone response data. The program code to convert the distributed velocity data to the equivalent geophone response data can comprise program code to apply a transfer function to the distributed velocity data. The transfer function can comprise a convolution of the distributed velocity data and a geophone instrument response.

The system further comprises a seismic source to generate seismic signals, and a DAS interrogator to receive optically-transmitted DAS measurement values from the optical fiber in response to the seismic signals. A digitizer is electrically connected to the DAS interrogator to convert the optically-transmitted DAS measurement values into the DAS data.

One or more non-transitory machine-readable media can comprise program code for determining equivalent geophone response data. The program code receives distributed acoustic sensing (DAS) data comprising measurements of a relative displacement of light over a gauge length of an optical fiber, separates the DAS data into a plurality of interleaving subsets associated with positions along the optical fiber, and determines distributed velocity data from the interleaving subsets. The distributed velocity data comprises velocity values for subset positions within the interleaving subsets.

The program code determines particle velocity values for the subset positions within the interleaving subsets can comprise program code to determine a seed particle velocity value for an interleaving subset and determine the particle velocity values for the subset positions within the interleaving subset based on the seed particle velocity value and distances along the optical fiber associated with the subset positions. The program code to determine the seed particle velocity value can comprise program code to determine first median values for the interleaving subsets and determine offsets for the interleaving subsets such that subtracting the offsets for the interleaving subsets from the first median values of the interleaving subsets results in second median values of zero for the interleaving subsets. The program code can further comprise program code to convert the distributed velocity data to equivalent geophone response data utilizing a convolution of the distributed velocity data and a geophone instrument response.

What is claimed is:

1. A method comprising:
   deploying an optical fiber in a borehole in a subsurface formation;
   detecting, from a seismic wave traversing the subsurface formation, distributed acoustic sensing (DAS) data via the optical fiber, wherein the DAS data comprises measurements of a relative displacement of light over a gauge length of the optical fiber;
   separating the DAS data into a plurality of interleaving subsets associated with positions along the optical fiber;
   converting the DAS data to distributed velocity data from the plurality of interleaving subsets based on a time rate of change of the relative displacement of light over the gauge length of the optical fiber, the distributed velocity data comprising particle velocity values for subset positions within the plurality of interleaving subsets; and
   determining one or more characteristics of the subsurface formation based on the distributed velocity data.

2. The method of claim 1, wherein converting the DAS data to particle velocity values for the subset positions within the plurality of interleaving subsets comprises:
   determining a seed particle velocity value for an interleaving subset; and
   determining the particle velocity values for the subset positions within the interleaving subset based on the seed particle velocity value and distances along the optical fiber associated with the subset positions.

3. The method of claim 2, wherein determining the seed particle velocity value comprises:
   determining first median values for the plurality of interleaving subsets; and
   determining offsets for the plurality of interleaving subsets such that subtracting the offsets for the interleaving subsets from the first median values of the interleaving subsets results in second median values of zero for the interleaving subsets.

4. The method of claim 1, wherein a number of the plurality of interleaving subsets is determined according to a gauge length of the optical fiber and an interchannel spacing.

5. The method of claim 1, further comprising:
   converting the distributed velocity data to equivalent geophone response data for the seismic wave.

6. The method of claim 5, wherein converting the distributed velocity data to the equivalent geophone response data for the seismic wave comprises applying a transfer function to the distributed velocity data.

7. The method of claim 6, wherein the transfer function comprises a convolution of the distributed velocity data and a geophone instrument response.

8. The method of claim 5, wherein converting the distributed velocity data to equivalent geophone response data comprises converting the distributed velocity data according to a central resonance frequency of a geophone and a circuit damping ratio of the geophone.

9. The method of claim 5, further comprising:
   performing an evaluation of the subsurface formation based on the equivalent geophone response data; and
   performing a hydrocarbon recovery operation based on the evaluation of the subsurface formation.

10. A system comprising:
    a processor; and
    a machine-readable medium having program code executable by the processor to cause the system to:
       receive distributed acoustic sensing (DAS) data comprising measurements of a relative displacement of light over a gauge length of an optical fiber;
       separate the DAS data into a plurality of interleaving subsets associated with positions along the optical fiber;
       convert the DAS data to distributed velocity data from the plurality of interleaving subsets based on a time rate of change of the relative displacement of light over the gauge length of the optical fiber, the distributed velocity data comprising particle velocity values for subset positions within the plurality of interleaving subsets; and
       determine one or more characteristics of a subsurface formation based on the distributed velocity data.

11. The system of claim 10, wherein the program code to cause the system to convert the DAS data to particle velocity values for the subset positions within the plurality of interleaving subsets comprises program code to:
    determine a seed particle velocity value for an interleaving subset; and
    determine the particle velocity values for the subset positions within the interleaving subset based on the seed particle velocity value and distances along the optical fiber associated with the subset positions.

12. The system of claim 11, wherein the program code to cause the system to determine the seed particle velocity value comprises program code to:
    determine first median values for the plurality of interleaving subsets; and
    determine offsets for the plurality of interleaving subsets such that subtracting the offsets for the plurality of interleaving subsets from the first median values of the interleaving subsets results in second median values of zero for the interleaving subsets.

13. The system of claim 10, wherein the program code further comprises program code to convert the distributed velocity data to equivalent geophone response data.

14. The system of claim 13, wherein the program code to convert the distributed velocity data to the equivalent geophone response data comprises program code to apply a transfer function to the distributed velocity data, wherein the transfer function comprises a convolution of the distributed velocity data and a geophone instrument response.

15. The system of claim 10, further comprising:
a seismic source to generate a seismic signal;
a DAS interrogator to receive optically-transmitted DAS measurement values from the optical fiber in response to the seismic signal; and
a digitizer electrically connected to the DAS interrogator to convert the optically-transmitted DAS measurement values into the DAS data.

16. One or more non-transitory machine-readable media comprising program code for determining equivalent geophone response data, the program code to:
receive distributed acoustic sensing (DAS) data comprising measurements of a relative displacement of light over a gauge length of an optical fiber;
separate the DAS data into a plurality of interleaving subsets associated with positions along the optical fiber;
convert the DAS data to distributed velocity data from the plurality of interleaving subsets based on a time rate of change of the relative displacement of light over the gauge length of the optical fiber, the distributed velocity data comprising velocity values for subset positions within the interleaving subsets; and
determine one or more characteristics of a subsurface formation based on the distributed velocity data.

17. The one or more non-transitory machine-readable media of claim 16, wherein the program code to convert the DAS data to particle velocity values for the subset positions within the plurality of interleaving subsets comprises program code to:
determine a seed particle velocity value for an interleaving subset; and
determine the particle velocity values for the subset positions within the interleaving subset based on the seed particle velocity value and distances along the optical fiber associated with the subset positions.

18. The one or more non-transitory machine-readable media of claim 17, wherein the program code to determine the seed particle velocity value comprises program code to:
determine first median values for the plurality of interleaving subsets; and
determine offsets for the plurality of interleaving subsets such that subtracting the offsets for the interleaving subsets from the first median values of the interleaving subsets results in second median values of zero for the interleaving subsets.

19. The one or more non-transitory machine-readable media of claim 16, wherein the program code further comprises program code to convert the distributed velocity data to equivalent geophone response data utilizing a convolution of the distributed velocity data and a geophone instrument response.

* * * * *